(12) United States Patent
Webb et al.

(10) Patent No.: US 9,513,776 B2
(45) Date of Patent: Dec. 6, 2016

(54) PROVIDING WIRELESS CONTROL OF A VISUAL AID BASED ON MOVEMENT DETECTION

(71) Applicant: AT&T Mobility II, LLC, Atlanta, GA (US)

(72) Inventors: J. Brad Webb, Katy, TX (US); Stephen T. Hardin, Suwanee, GA (US); Zachary O. Morsbach, Cedar Park, TX (US)

(73) Assignee: AT&T MOBILITY II, LLC, Atlanta, GA (US)

( * ) Notice: Subject to any disclaimer, the term of this patent is extended or adjusted under 35 U.S.C. 154(b) by 233 days.

(21) Appl. No.: 13/705,945

(22) Filed: Dec. 5, 2012

(65) Prior Publication Data

US 2014/0157130 A1    Jun. 5, 2014

(51) Int. Cl.
*G06F 3/0484* (2013.01)
*G06F 3/01* (2006.01)

(52) U.S. Cl.
CPC ............ *G06F 3/0484* (2013.01); *G06F 3/017* (2013.01)

(58) Field of Classification Search
CPC .................................................. G06F 3/0484
USPC ........................................................ 715/730
See application file for complete search history.

(56) References Cited

U.S. PATENT DOCUMENTS

| | | | |
|---|---|---|---|
| 6,792,430 B1 * | 9/2004 | Kenyon | G06F 17/30864 |
| 7,796,982 B2 | 9/2010 | Mohanty | |
| 8,325,138 B2 | 12/2012 | Touma et al. | |
| 2004/0049488 A1 * | 3/2004 | Kenyon | G06F 17/30864 |
| 2005/0049939 A1 * | 3/2005 | Lai | G06Q 30/0601 705/26.1 |
| 2005/0110868 A1 * | 5/2005 | Myers | 348/47 |
| 2005/0192920 A1 * | 9/2005 | Hodge | G06F 17/30855 |
| 2006/0068917 A1 * | 3/2006 | Snoddy | A63F 13/12 463/42 |
| 2009/0322676 A1 * | 12/2009 | Kerr et al. | 345/158 |
| 2010/0303289 A1 * | 12/2010 | Polzin | A63F 13/06 382/103 |
| 2011/0197147 A1 * | 8/2011 | Fai | 715/753 |
| 2011/0230238 A1 * | 9/2011 | Aronsson et al. | 455/566 |
| 2011/0289456 A1 * | 11/2011 | Reville et al. | 715/830 |
| 2013/0055143 A1 * | 2/2013 | Martin et al. | 715/779 |
| 2013/0254699 A1 * | 9/2013 | Bashir | G06F 3/0481 715/772 |
| 2014/0040273 A1 * | 2/2014 | Cooper | G06F 17/3002 707/741 |

* cited by examiner

*Primary Examiner* — Ryan Barrett
*Assistant Examiner* — F J Farhadian
(74) *Attorney, Agent, or Firm* — Akerman LLP; Michael K. Dixon; Mammen (Roy) P. Zachariah, Jr.

(57) ABSTRACT

A system for providing wireless control of a visual aid based on movement detection is disclosed. The system also enables a presenter to gesture at a visual aid and have a pointer be displayed on screens displaying the visual aid. The system may generate a three-dimensional depth image of an environment including a user and a device displaying the visual aid. Additionally, the system may determine a position of the user relative to the environment and to the device based on the three-dimensional image. Furthermore, the system may detect a gesture based on the position of the user and the three-dimensional depth image. If the gesture made by the user matches a predetermined input gesture corresponding to a controller operation for controlling the visual aid, then the controller operation may be executed. The system may display an output of the executed controller operation at a remote device.

20 Claims, 6 Drawing Sheets

PROVIDING WIRELESS CONTROL OF A VISUAL AID BASED ON MOVEMENT DETECTION

FIELD OF THE INVENTION

The present application relates to wireless controller technologies, and more particularly, to a system and method for providing wireless control of a visual aid based on movement detection.

BACKGROUND

In today's society, people have been increasingly adopting use of devices such as computers, mobile phones, and tablets to conduct online or virtual meetings related to work, entertainment, or other purposes. By utilizing such devices, people can save a tremendous amount of time and resources by not having to be physically present with other people in the same location to conduct a meeting, webinar, conference, or other type of collaborative activity. As an example, in order to conduct an online meeting, a presenter can send a link to any potential meeting participants that the presenter wants to participate in the online meeting. The link can include visual aid information associated with the online meeting such as date, time, venue, and topic of discussion. Each meeting participant can click on the link and be allowed to view the contents of the presenter's computer desktop on their own personal computer so that they can access or view the presenter's presentation in real-time. For example, the meeting participants may be able to view the digital presentation slides of the presenter on their own computer during the presentation. Additionally, the meeting participants may also receive audio feed of the presenter's speech during the presentation so that the participants can enjoy the meeting experience as if they were in the same physical room with the presenter. The presenter can use his or her computer keyboard to change the presentation slides as they give the presentation. Alternatively, the presenter may use a remote controller to change or interact with the slides as well.

As users have become increasingly comfortable with devices such as mobile phones, computers, tablets and other devices for performing various tasks or for media consumption, users have found that such devices are often useful in conducting web presentations, conferences, online meetings, and other types of interactive gatherings without having to be in the same physical location as other users. For example, users can utilize such devices to remotely connect to an online presentation being presented by a presenter. While delivering the presentation, the presenter may focus on a particular area of a slide in the presentation by using a laser pointer, by pointing at the particular area with his or her finger, or by using other means. However, often times, the remote participants cannot see what area on the slide the presenter is focusing on when the presenter uses a laser pointer or points with a finger to emphasize the area of focus. This is because the remote participants are typically using traditional desktop sharing technologies to connect to the presentation or are simply viewing presentation slides that were downloaded by the remote participants. As a result, the presenter often resorts to verbally telling the remote participants the location on the slide that the presenter wants the participants to focus on. This often increases conference times by causing interruptions during the presentation and makes for a less effective presentation by distracting the participants.

SUMMARY

A system and accompanying methods for providing wireless control of a visual aid based on movement detection are disclosed. A user may deliver a presentation using the visual aid to an audience and may utilize the system to control the visual aid or device displaying the visual aid. Additionally, the user may utilize the system to transmit various types of content, signals, and outputs of operations executed on the user's computing device, to one or more remote users that are using devices that are communicatively linked to the visual aid of the user. In particular, the system may be utilized to generate a three-dimensional depth image of an environment, which includes the user and a device displaying the visual aid. The system may then determine a position of the user relative to the environment and to the device based on the three-dimensional depth image. Then, the system may monitor the user to detect gestures from the user. The gestures may be detected at least in part on the position of the user and the three-dimensional depth image.

If the system detects that the user has made a gesture, the system can determine if the gesture matches a predetermined input gesture that corresponds to a controller operation for controlling the visual aid or device displaying the visual aid. If the system determines that the gesture matches the predetermined input gesture, the system can execute the controller operation corresponding to the gesture, and then display an output of the executed controller operation at an interface of a remote device linked to the visual aid. For example, if the user waves his hand and the gesture of waving a hand corresponds to the operation of moving to a next digital page in a visual aid, the system can cause the digital page to be changed and generate a visual output to users participating in the presentation that uses the visual aid, which shows the digital page changing from a current digital page to a next digital page.

The system for providing wireless control of a visual aid based on movement detection may include a memory that stores instructions and a processor that executes the instructions to perform operations in the system. The system may generate a three-dimensional depth image of an environment including a user and a device displaying the visual aid by utilizing the instructions stored in memory. Once the three-dimensional depth image of the environment is generated, the system may determine a position of the user relative to the environment and to the device based on the three-dimensional depth image. The system may then detect a gesture from the user based in part on the position of the user and the three-dimensional depth image. Once the gesture is detected by the system, the system may determine if the gesture from the user matches a predetermined input gesture corresponding to a controller operation for controlling the visual aid. If the gesture from the user matches the predetermined input gesture, the system may execute the controller operation. The system may then display an output of the executed controller operation at an interface of a remote device communicatively linked to the visual aid.

In another embodiment, a method for providing wireless control of a visual aid based on movement detection is provided. The method may include generating a three-dimensional depth image of an environment including a user and a device that is displaying the visual aid. The method may also include determining a position of the user relative to the environment and to the device based on the three-dimensional depth image. Once the position of the user is determined, the method may include detecting a gesture from the user based in part on the position of the user and the three-dimensional depth image. The method may also include determining if the gesture from the user matches a predetermined input gesture that corresponds to a controller operation for controlling the visual aid. If the gesture from the user matches the predetermined input gesture, the method may include executing the controller operation by utilizing instructions stored in memory and executed by a processor. Furthermore, the method may include displaying an output of the executed controller operation at an interface of a remote device communicatively linked to the visual aid.

According to another exemplary embodiment, a computer-readable medium comprising instructions for providing wireless control of a visual aid based on movement detection is provided. The computer instructions, which when loaded and executed by a processor, may cause the processor to perform operations comprising: generating a three-dimensional depth image of an environment including a user and an interface displaying the visual aid; determining a position of the user relative to the environment and to the interface based on the three-dimensional depth image; detecting a gesture from the user based in part on the position of the user and the three-dimensional depth image; determining if the gesture from the user matches a predetermined input gesture corresponding to a controller operation for controlling the visual aid; executing the controller operation if the gesture from the user matches the predetermined input gesture; and displaying an output of the executed controller operation at an interface of a remote device communicatively linked to the visual aid.

These and other features of the wireless control systems and methods are described in the following detailed description, drawings, and appended claims.

DETAILED DESCRIPTION OF THE INVENTION

A wireless control system 100 for controlling a visual aid based on movement detection is disclosed in the present disclosure. Referring to the drawings and in particular to FIGS. 1-4, the system 100 may enable a user 105 to wirelessly control a visual aid 126 when the user 105 performs various types of gestures, body movements, or a combination thereof. The visual aid 126, for example, may be, but is not limited to being, a digital presentation created on a digital presentation program, presentation slides, a video, or any object or picture that may be utilized as an aid to help explain a particular subject or as an aid for any other purpose. The user 105 may deliver a presentation, using the visual aid 126, to one or more participants participating in the presentation by using a device 120. The device 120 may be a computer, monitor, tablet, projector screen, interactive surface, or any other device capable of displaying the visual aid 126 or program. While the presentation is being delivered or at other times or conditions, the system 100 may utilize an image capture device 110 to generate a three-dimensional depth image of an environment 106, which includes the user 106 and a device 120 displaying the visual aid 126. Once the system 100 generates the three-dimensional depth image, the system 100 may then determine a position of the user 105 relative to the environment 106 and to the device 120 based, at least in part, on the three-dimensional depth image. As the user 105 is delivering the presentation using the visual aid 126, the system 100 may monitor the user 105 to detect gestures from the user 105. The gestures, for example, can include, but are not limited to including, hand waving, finger pointing, closing a fist, moving forwards and backwards, pointing a laser beam from a laser pointer at the presentation, moving from side to side, raising or lowering a leg, or a variety of other gestures that the user 105 can perform.

The system 100 may detect the gestures based in part on the determined position of the user 105 and the three-dimensional depth image. If the system 100 detects that the user 105 has made a gesture, the system 100 can determine if the gesture matches a predetermined input gesture that corresponds to a controller operation that may be utilized for controlling the visual 126. As an example, the predetermined input gesture may be the gesture of waving one's hand at the device 120 and the corresponding controller operation may be to change a digital page in the visual aid 126. If the system 100 determines that the user's 105 gesture matches the predetermined input gesture, the system 100 can execute the controller operation, and then display an output of the executed controller operation at an interface 151 of a remote device 150 linked to the visual aid 126. Continuing with the previous example, if the user 105 waves his hand and the gesture of waving ones hand corresponds to the operation of changing to the next digital page in the visual aid 126, the system 100 can change the current digital page to a next digital page upon detection of the gesture. The system 100 can then generate an output that can be displayed on the interface 151 of the remote device 150, which, in this case, can be a visual that shows the current digital page being changed to the next digital page in the visual aid 126.

Notably, the system 100 may utilize a combination of software and hardware to perform the operative functions of the system 100 disclosed herein. Additionally, although FIGS. 1-4 illustrate specific example configurations of the various components of the system 100, the system 100 may include any configuration of the components, which may include using a greater or lesser number of the components. For example, the system 100 is illustratively shown as including a user 105, an image capture device 110, a device 120, a communications network 135, a server 140, a database 145, a remote device 150, and a pointer 155. However, the system 100 may include multiple devices 110, multiple servers 140, multiple communications networks 135, multiple databases 145, multiple remote devices 150, and pointers 155. Furthermore, in one embodiment, the entire functionality of the system 100 may be performed by the image capture device 110 or the device 120 without need for the server 140, the database 145, or any combination thereof.

Figure 1:
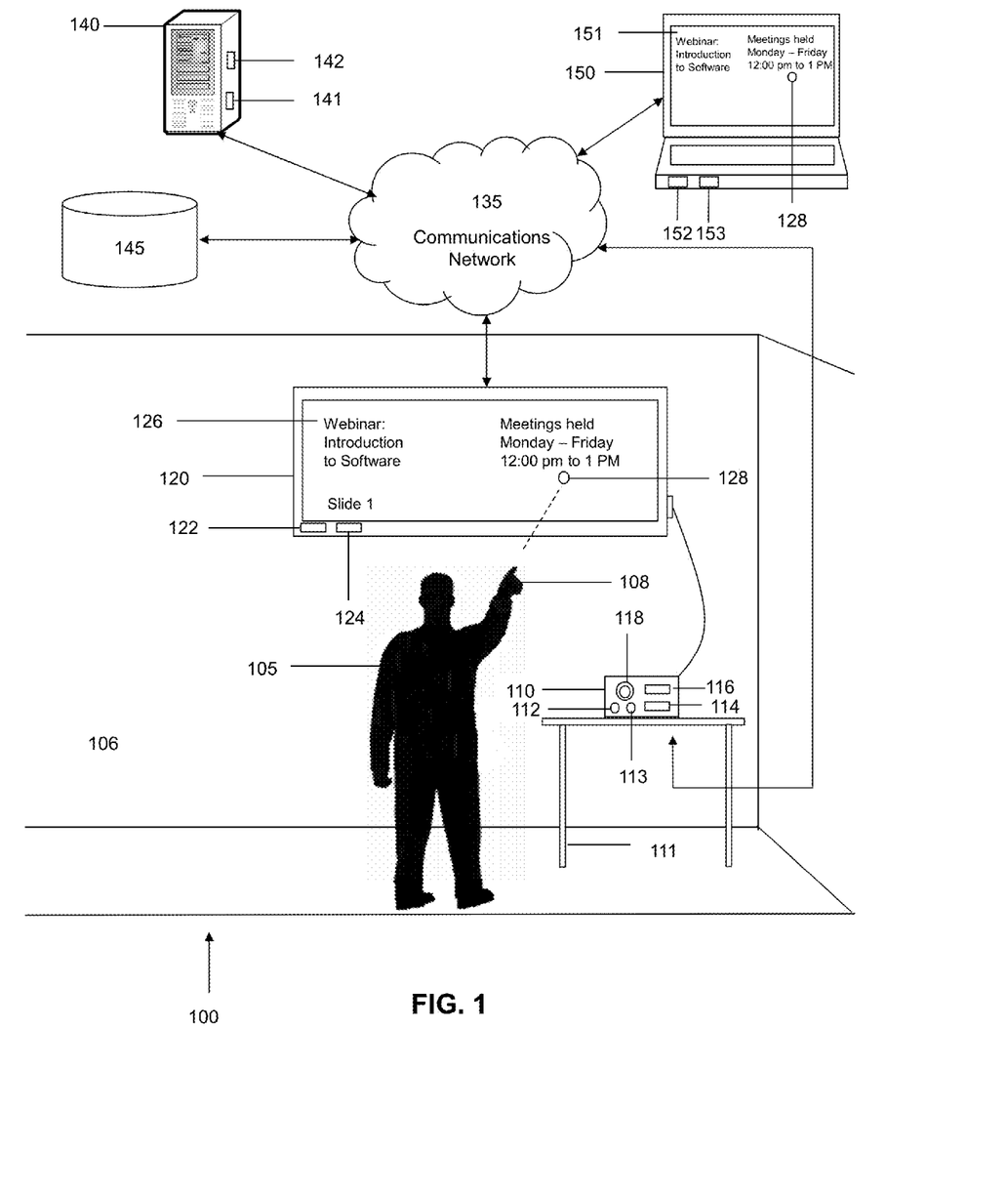
FIG. 1 is a schematic illustration featuring a view of a system for providing wireless control of a visual aid based on movement detection according to an embodiment of the present disclosure.

Operatively, the system 100, as illustrated in FIG. 1, may be configured to initially run and display a visual aid 126 or program on a device 120. Additionally, the device 120 may include a processor 122 for performing various operations in the system 100, such as displaying the visual aid 126, and a memory 124 for storing instructions that the processor 122 can execute. One or more remote users can remotely connect to the visual aid 126, via communications network 135, by utilizing remote devices 150, which may also include their own processors 152 and memories 153 for performing operations and storing instructions respectively. The system 100 may be configured to generate a three-dimensional depth image of the environment 106 that includes the user 105 and the device 120 displaying the visual aid 126.

Figure 4:
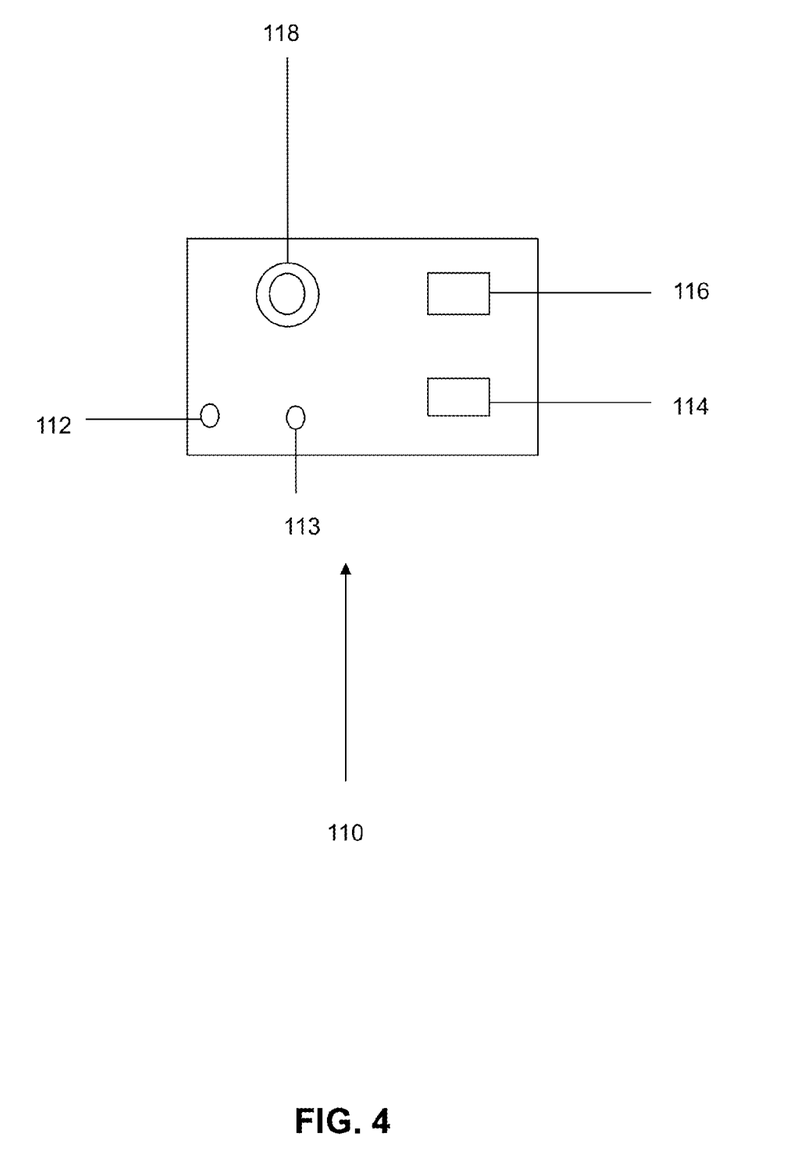
FIG. 4 is a schematic illustration of a device including a camera and other components for generating a three-dimensional image and detecting gestures according to an embodiment of the present disclosure.

In one embodiment, as shown in FIG. 4, the three-dimensional depth image of the environment 106 may be generated by utilizing the image capture device 110. The image capture device 110 may include or otherwise be communicatively linked to one or more processors 114 that may be configured to perform or process any of the operations conducted in the system 100. The processors 114 may be software, hardware, or a combination thereof. The image capture device 110 may also include a memory 116, which may be configured to store instructions that the processors 114 may execute to perform various the operations of the system 100. Additionally, the image capture device 110 may also include a microphone 112 for receiving and recording sound inputs, such as speech from the user 106. The image capture device 110 may further include an emitter 113, which may be a light emitter that can project a pattern of light, such as infrared or other types of light, into the environment 106.

The image capture device 110 may further include a camera 118, which may capture media content and depth information associated with the user 105 and the environment 106. The media content recorded by the image capture device 115 may include visual content, audio content, or any other recordable content. In one embodiment, the image capture device 110 may capture media content associated with the user 105 and the environment 106 once the user 105 either turns on the image capture device 110 or selects an option in the program that runs the visual aid 126. For example, the user 105 may select an option to "activate emitter and generate three-dimensional image" from a drop down menu in the software program running the visual aid 126. Additionally, the image capture device 110 may be positioned in any location or position, such as on the device 120 or any other location. For example, in FIG. 1, the image capture device 110 is illustratively shown as resting on a table 111, however, in FIG. 3, the image capture device 110 is shown as resting on the left shoulder of the user 105. In other embodiments, the image capture device may be placed in other locations. Notably, the image capture device 110 may be communicatively linked with any of the components in the system 100 and may transmit information generated or received by the image capture device 110 to any of the other components in the system 100 (e.g. database 145, server 140, remote device 150, etc.), such as by utilizing communications network 135.

In order to generate the three-dimensional depth image, the image capture device 110 may utilize any suitable technique such as stereoscopy, structured light, or other techniques. For example, the image capture device 110 may send a signal to the emitter 113 to project a light pattern of pixels into the environment 106. This light pattern may be an infrared light grid pattern, ultraviolet light grid pattern, or other pattern that may be utilized for generating three-dimensional images. Once the light grid pattern contacts the surfaces of the various objects (e.g. user 105, device 120, table 111, etc.), the camera 118 of the image capture device 110 can detect deformations, distortions, alterations, or a combination thereof, in the light grid pattern to calculate the depth and surface information of the objects in the environment 106. As the depth and surface information is obtained by the image capture device 110, the processor 114 of the image capture device 110 can process the depth information to generate the three-dimensional depth image. The three-dimensional depth image can allow the image capture device 110 or other devices in the system 100 to distinguish the user 105, the device 120, the pointer 155, or other objects in the environment 106 from one another.

Figure 2:
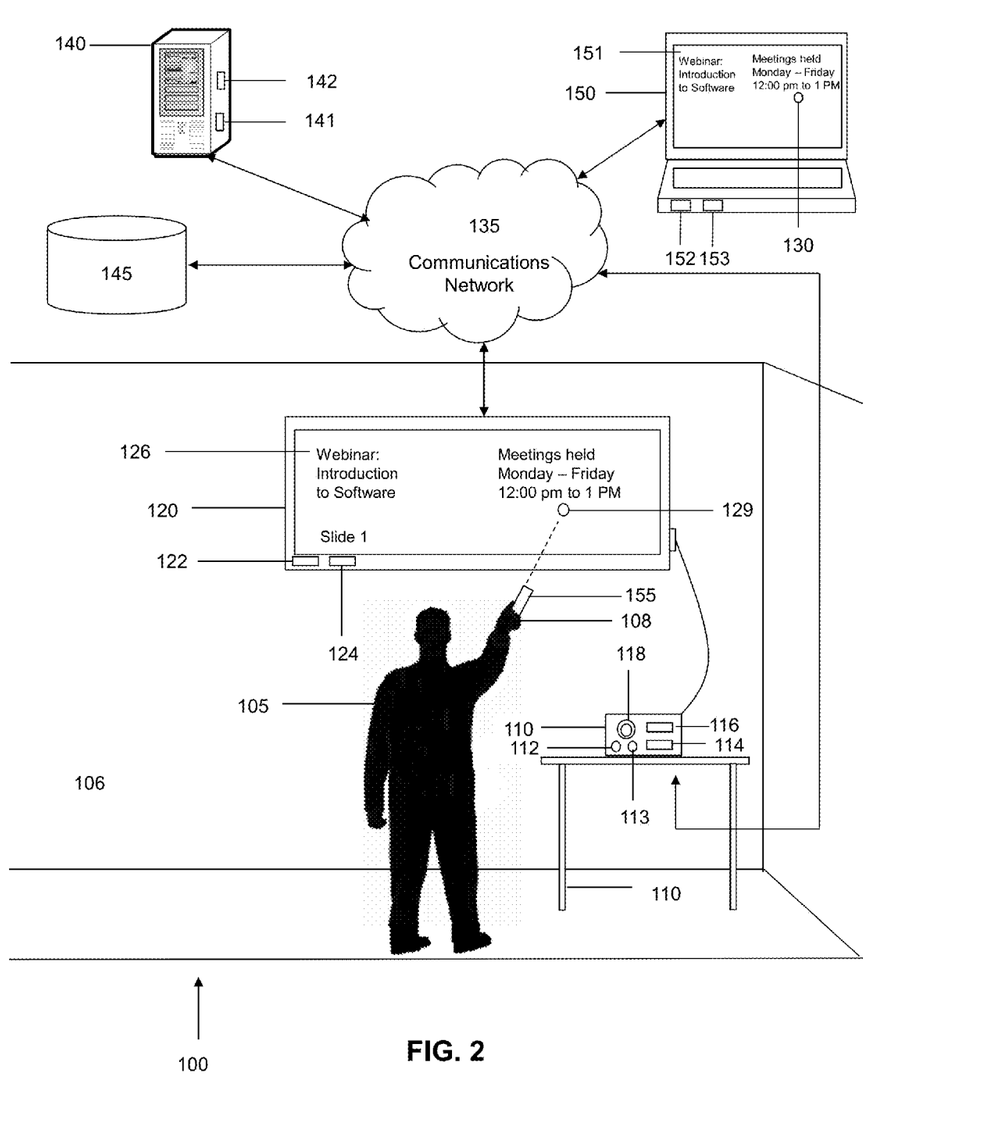
FIG. 2 is a schematic illustration featuring a view of the system for providing wireless control of the visual aid of FIG. 1, which can detect a laser beam from a laser pointer and transmit a visual representation of the laser beam to a remote device according to an embodiment of the present disclosure.
Figure 3:
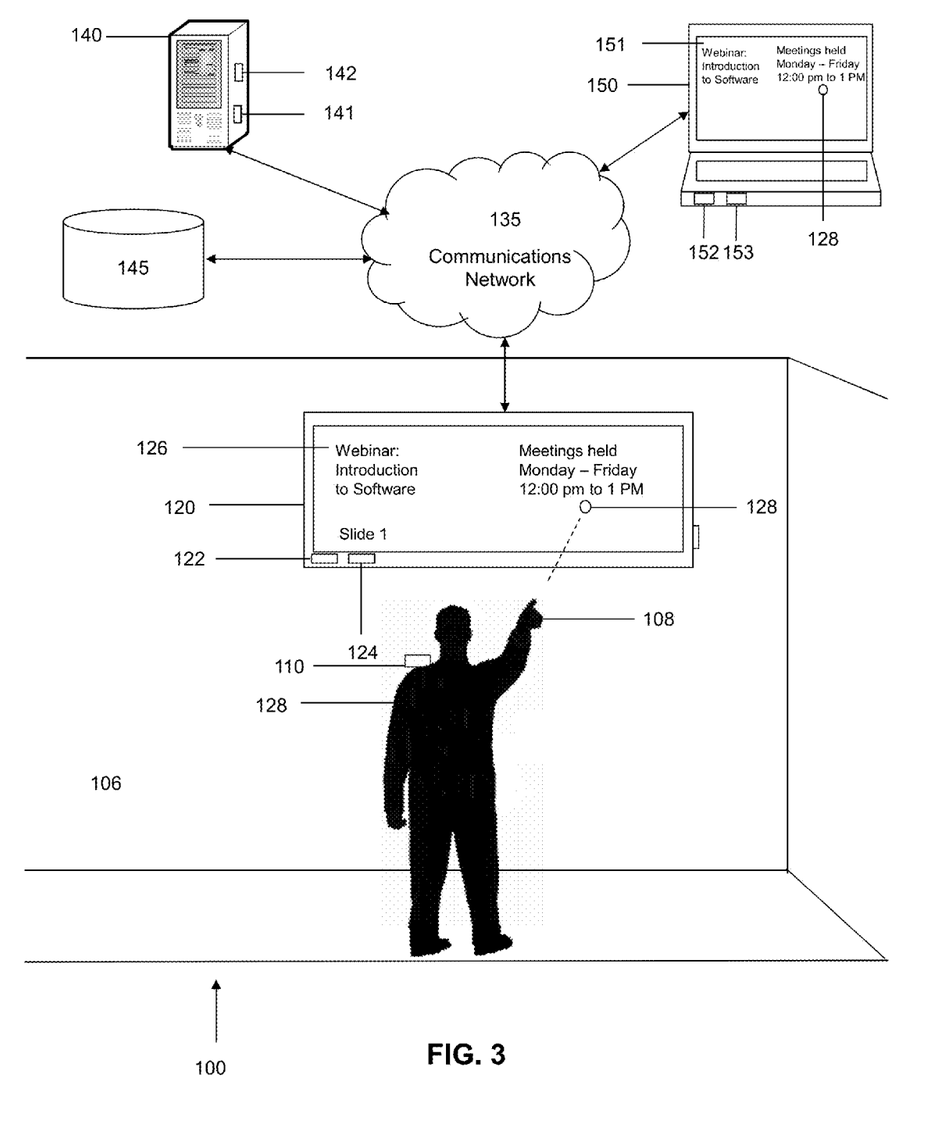
FIG. 3 is a schematic illustration featuring a view of the system for providing wireless control of the visual aid of FIG. 1, which features placing a device on the body of a user delivering a presentation, wherein the device includes a camera and other components for generating a three-dimensional image and detecting gestures according to an embodiment of the present disclosure.

Using the three-dimensional depth image, the system 100, as shown in FIGS. 1-3, can determine a position of the user 105 relative to the environment 106, to the device 120, or to any other object within the range of the system 100. In one embodiment, the position of the user 105 may be expressed as a physical distance (e.g. feet, inches, meters, centimeters etc.) with respect to the device 120, the image capture device 110, or any other reference point. The system 100 may also be configured to determine not only the position of the user 105, but also the positions of each body part of the user 105, such as the user's hand 108, and also the position of the pointer 155. The pointer 155 may be a traditional laser pointer or any other type of pointer that the user can use to highlight or emphasize a particular portion of the visual aid 126. The position of the user 105 may be determined by the system 100 in real time as the user 105 moves about the environment 106. In one embodiment, real time may mean determining the movement of the user 105 within milliseconds, microseconds, or other miniscule unit of time of the user 105 adjusting his or her position in any way. Also, in one embodiment, the term real time may mean determining the position of the user 105 at the same time that the user 105 changes his or her position.

As the three-dimensional depth images are generated and the position information is determined, the system 100 can detect gestures from the user 105 based at least in part on the three-dimensional depth images and the position information. The gestures may be detected by the image capture device 110 itself or with the use of any of the other components in the system 100. Gestures, for example, may include waving a hand, pointing a finger, closing a fist, moving the user's body forwards and backwards, pointing a laser beam from pointer 155 at the visual aid 126, moving the user's body from side to side, raising or lowering a leg, or any other conceivable gesture that the user 105 can perform.

Once a gesture is detected by the system 100, the system 100 can determine if the gesture matches a predetermined input gesture that corresponds to a controller operation for controlling the visual aid 126, the device 120, or a combination thereof. The predetermined input gestures can include waving a hand, pointing a finger, or any other possible gesture that is specifically associated with and programmed to a particular controller operation. The controller operation, for example, may include, but is not limited to including, an operation for changing a digital page in the visual aid 126, starting or ending the visual aid 126, starting or stopping audio associated with the visual aid 126, generating a visual pointer 128 for the visual aid 126, as shown in FIG. 1, generating a visual representation of a laser beam 130 pointed at the visual aid 126, as shown in FIG. 2, generating a virtual link or button, adding or removing a remote user, opening or closing a program other than the program running the visual aid 126, editing the digital pages or other content shown using the visual aid 126, or any other conceivable operation for controlling, adjusting, enhancing, or manipulating the visual aid 126 or any program that may run on the device 120. In one embodiment, the controller operation may be an operation for controlling any device in the system 100 or that is capable of connecting to the system 100. As an example of a predetermined input gesture corresponding to a controller operation, the gesture of waving a hand may be associated with the controller operation of changing a current digital page in the visual aid 126 to a next digital page.

If the system 100 determines that the gesture performed by the user 105 does not match a predetermined input gesture for controlling the visual aid 126, the system 100 may not execute a controller operation. However, if the system 100 determines that the gesture performed by the user 105 matches a predetermined input gesture for controlling the visual aid 126, the system 100 may execute the controller operation linked to the predetermined input gesture. For example, if user 105 waves his hand 108 and the gesture of waving a hand 108 is associated with the operation of changing to a next digital page in the visual aid 126, the system 100 will execute the operation so that the current digital page will be changed to the next digital page in the visual aid 126. As another example as shown in FIGS. 1 and 3, if the gesture of pointing at the visual aid 126 with a finger is associated with the operation of generating a visual pointer 128 that tracks the movement of the finger of the user 105, then the system 100 can cause a visual pointer 128 to be generated at the location on the visual aid 126 to which the finger is pointing. The system 100 can then cause the visual pointer 128 to move on the visual aid 126 such that the visual pointer 128 tracks the movement of the user's finger. The same visual pointer 128 may be generated at the remote device 150 or generated by the system 100 and sent to the remote device 150. As yet another example, as shown in FIG. 2, the system 100 cannot only execute operations based on body gestures, but also gestures the user 105 makes with other devices, such as the pointer 155. In one embodiment, the pointer 155 may be a laser pointer and the system 100 can detect that the user 105 is pointing the laser beam 129 from the pointer 155 onto a portion of the device 120 displaying the visual aid 126. Upon detection of the laser beam 129 on the portion of the device 120, the system 100 can generate a visual representation of the laser beam 130, which may be forwarded to remote devices 150 connected to the visual aid 126.

Once a particular controller operation associated with a gesture is executed by the system 100, the system 100 can display an output of the executed controller operation at the device 120, at the interface 151 of a remote device 150 connected to the visual aid 126, or both. For example, if the executed operation was to change the digital page from the current digital page to a next digital page in the visual aid 126, the system 100 can cause the device 120 and the remote device 150 to show a visualization or animation of the current digital page changing to the next digital page. Similarly, if the executed operation was to generate the visual pointer 128 based on the user 105 pointing at the visual aid 126, as shown in FIGS. 1 and 3, the system 100 may display the visual pointer 128 on the device 120 and on the interface 151 of the remote device 150. As the user 105 moves his finger, the system 100 can cause the visual pointer 128 to track the movements of the user's finger such that the visual pointer 128 simulates a laser pointer being moved in different directions on the visual aid 126. As yet another example, as shown in FIG. 2, the system 100 can display the generated visual representation of the laser beam 130 on the remote device 150, which can be shown to visually move on the interface 151 in a manner that tracks the movement of the laser beam 129 on the device 120. In this way, a user using the remote device 150 can see what the user 105 is emphasizing during the presentation without having to see an actual video feed of the user 105 in the environment 106.

Notably, the image capture device 110 may generate the three-dimensional images, detect the position of the user 105, detect the gesture information, execute the controller operations, display the outputs of the executed controller operations, or perform any of the operative functions disclosed herein by itself on a continuous or periodic basis. However, the image capture device 110 may also utilize the processing capabilities of the device 120, the server 140, the storage capacity of the database 145, or any other component of the system 100 to perform the operative functions disclosed herein. The server 140 may include one or more processors 141 that may be configured to process any of the various functions of the system 100. The processors 141 may be software, hardware, or a combination of hardware and software. Additionally, the server 140 may also include a memory 142, which store instructions that the processors 141 may execute to perform various operations of the system 100. For example, the server 150 may assist in generating the three-dimensional depth image, determine the position of the user, detect gestures, execute controller operations, display outputs of controller operations, or any combination thereof. In one embodiment, multiple servers 140 may be utilized to process the functions of the system 100. The server 140, image capture device 110, or other devices in the system 100, may utilize the database 145 for storing the three-dimensional depth images, the position information, the gesture information, or any other information traversing the system 100. Additionally, the database 145 may store data for any number of users 105 and any number of controller operation and gesture associations. In one embodiment, multiple databases 145 may be utilized to store data in the system 100. Furthermore, the communications network 135 may be any other suitable network that may be utilized to allow the various components of the system 100 to communicate with one another. For instance, the communications network 135 may be a wireless network, an ethernet network, a satellite network, a broadband network, a cellular network, a private network, a cable network, the Internet, any combination thereof.

Figure 5:
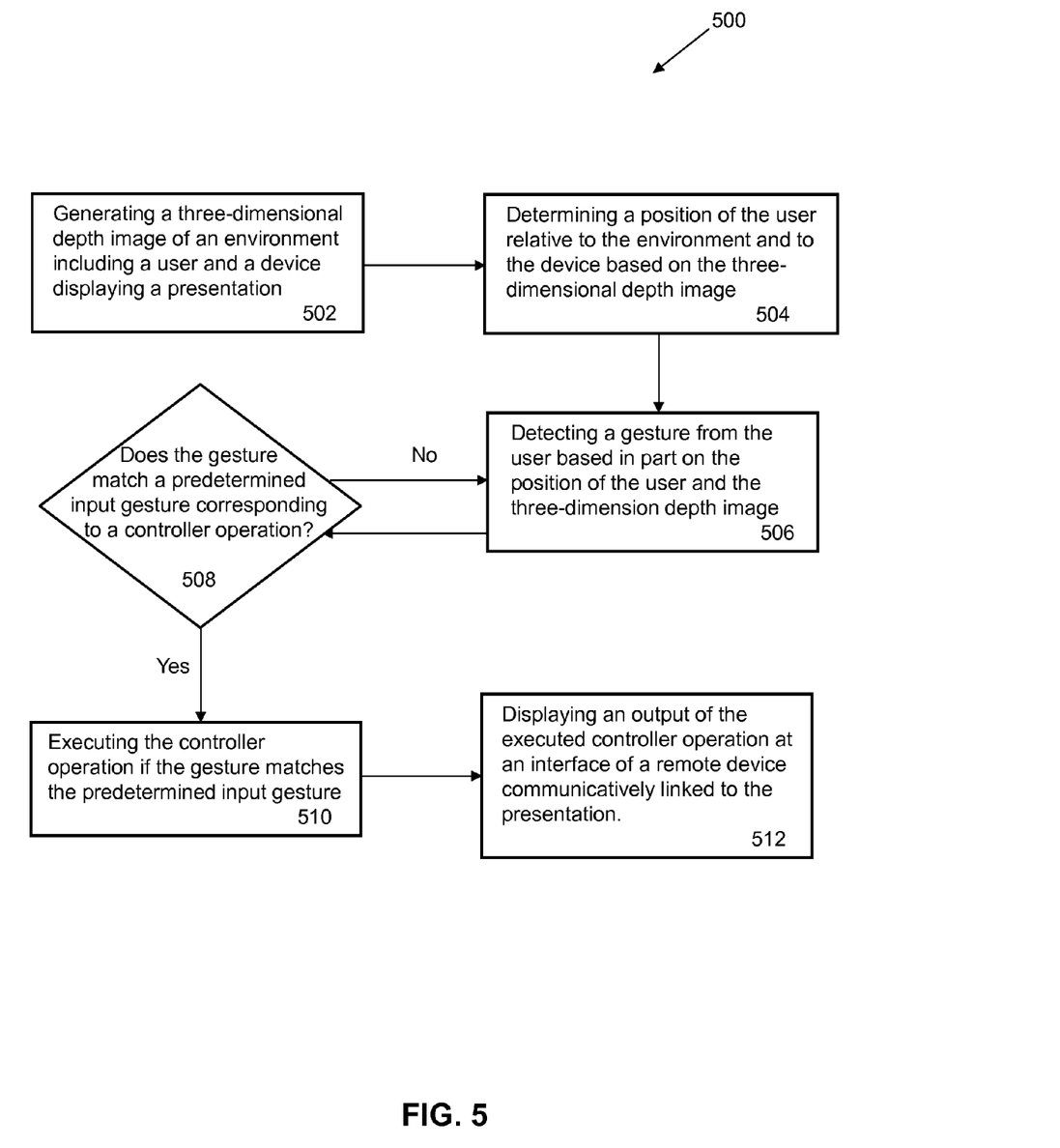
FIG. 5 is a flow diagram illustrating a sample method for providing wireless control of a visual aid based on movement detection according to the present disclosure.

As shown in FIG. 5, an exemplary method 500 for providing wireless control of a visual aid based on movement detection, as shown in FIG. 5, is schematically illustrated. The method 500 may include, at step 502, generating a three-dimensional depth image of an environment 106 that includes a user 105 and a device 120 displaying a visual aid 126 or program. The three-dimensional image may be generated by utilizing techniques such as stereoscopy, structured light, or other techniques as disclosed herein. In one embodiment, the three-dimensional image may be generated by the image capture device 110, the device 120, the server 140, any combination thereof, or other appropriate device. At step 504, the method 500 may include determining a position of the user 105 (or any desired object in the environment 106) relative to the environment 106 and to the device 120 based at least in part on the three-dimensional depth image. In one embodiment, the position of the user 105 may be determined by the image capture device 110, the device 120, the server 140, any combination thereof, or other appropriate device.

Once the position of the user 105 is determined, the method 500 may include detecting a gesture from the user 105 based in part on the position of the user 105 and the three-dimensional depth image at step 506. In one embodiment, the gestures may be detected by the image capture device 110, the device 120, the server 140, any combination thereof, or other appropriate device. As noted herein, the gestures may include, but are not limited to including, hand waving, finger pointing, closing a fist, moving forwards and backwards, pointing a laser beam from a laser pointer, moving from side to side, raising or lowering a leg, or any other gestures that the user 105 can perform. At step 508, the method 500 may include determining if the gesture from the user 105 matches a predetermined input gesture corresponding to a controller operation for controlling the visual aid 126, device 120, or both.

If the gesture from the user 105 does not match a predetermined input gesture corresponding to a controller operation, the method 500 may revert to step 506 and continue to detect gestures. However, if the gesture from the user 105 does match a predetermined input gesture corresponding to a controller operation, the method 500 may, at step 510, include executing the controller operation associated with the predetermined input gesture. In one embodiment, the controller operation may be executed by the image capture device 110, the device 120, the server 140, any combination thereof, or other appropriate device. At step 512, the method may include displaying an output of the executed controller operation at an interface 151 of a remote device 150 connected to the visual aid 126 or device 120. In one embodiment, the output may be displayed by the image capture device 110, the device 120, the server 140, the remote device 150, any combination thereof, or other appropriate device.

In one embodiment, the system 100 and methods described herein may include detecting sounds, such as, but not limited to, speech from the user 105. The detected speech may be associated with a predetermined input speech or gesture that is associated with a controller operation for controlling the visual aid 126 or any other device in the system 100. If the system 100 determines that the detected speech from the user 105 matches a predetermined input speech or gesture associated with a controller operation, the system 100 can execute the operation, and in effect, make the detected speech an executable voice command. In one embodiment, the controller operation may comprise adjusting the volume associated with the visual aid 126 or adjusting media content associated with the visual aid 126. In one embodiment, the system 100 and methods described herein may further include utilizing any of the various components described in the system 100 to perform the operative functions disclosed herein.

It is important to note that the methods described above may incorporate any of the functionality, devices, and/or features of the systems described above, or otherwise, and are not intended to be limited to the description or examples provided herein.

Figure 6:
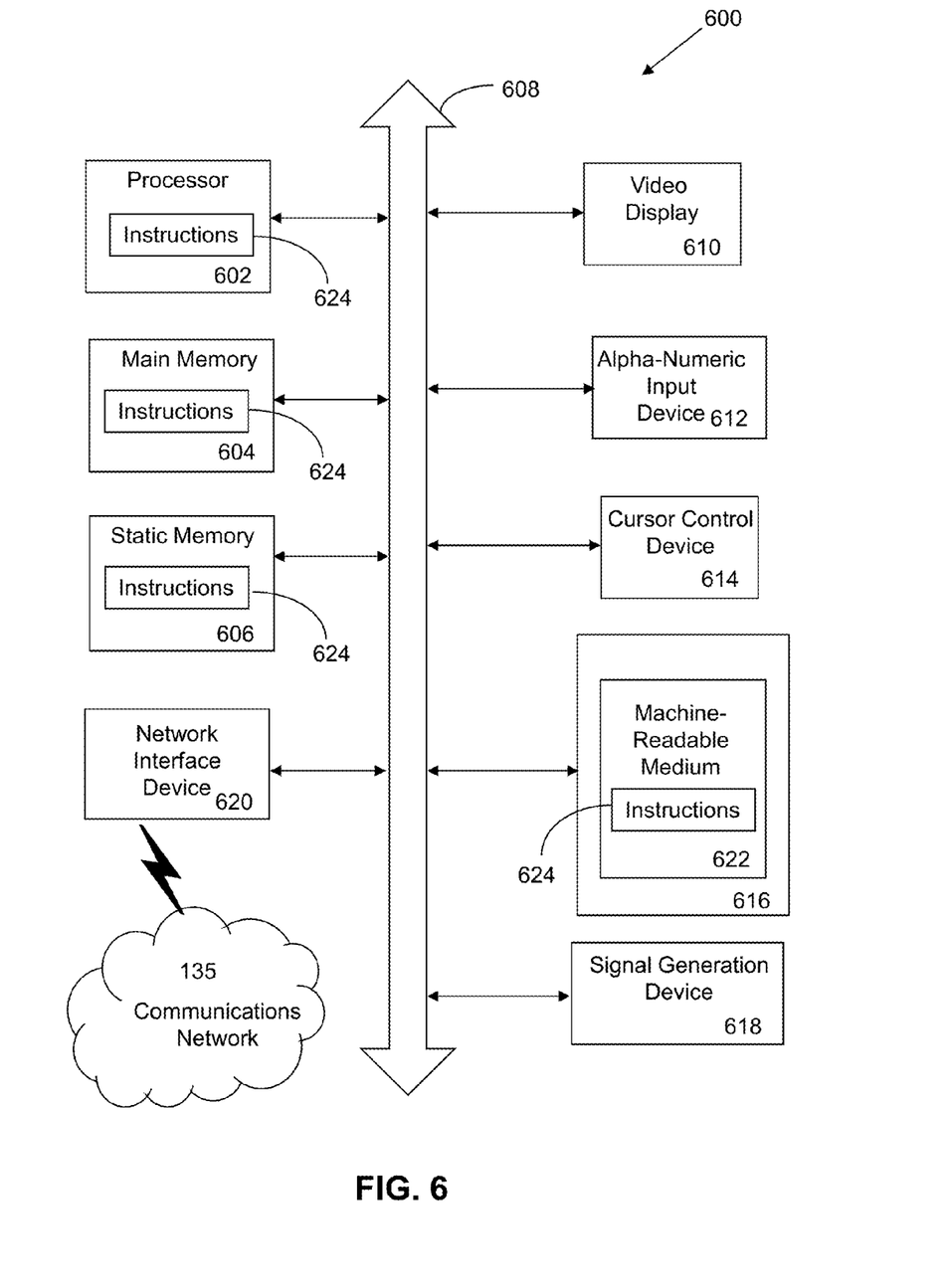
FIG. 6 is a diagrammatic representation of a machine in the form of a computer system within which a set of instructions, when executed, may cause the machine to perform any one or more of the methodologies discussed herein.

Referring now also to FIG. 6, at least a portion of the methodologies and techniques described with respect to the exemplary embodiments can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine operates as a standalone device. In some embodiments, the machine may be connected (e.g., using a communications network 135) to and assist with operations performed by other machines, such as, but not limited to, the device 110, the server 140, the database 145, or any combination thereof. The machine may be connected with any component in the system 100. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 604, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions 624 (e.g., software) embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 622 containing instructions 624 so that a device connected to the communications network 135 can send or receive voice, video or data, and to communicate over the communications network 135 using the instructions. The instructions 624 may further be transmitted or received over the communications network 135 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system for providing wireless control of a visual aid based on movement detection, comprising:
a memory that stores instructions; and
a processor that executes the instructions to perform operations, the operations comprising:
presenting a presentation by utilizing the visual aid;
positioning an image capture device on a shoulder of a user;
receiving, via a software program running the visual aid, a selection of an option to activate a light emitter of the image capture device and generate a three-dimensional depth image, wherein the option is selected via a menu in the software program;
activating, after receiving the selection of the option to activate the light emitter and generate the three-dimensional depth image, the light emitter of the image capture device positioned on the shoulder of the user;
generating, after receiving the selection of the option to activate the light emitter and generate the three-dimensional depth image and after activating the light emitter, the three-dimensional depth image of an environment including hands of the user and a device displaying the visual aid,
wherein the hands of the user are positioned between the image capture device and the presentation;
determining, based on the three-dimensional depth image, a position of the user relative to the environment, relative to the device displaying the visual aid, and relative to a camera of the image capture device in the system;
detecting a first gesture from the user based in part on the position of the user and the three-dimensional depth image;
determining if the first gesture from the user matches a first predetermined input gesture corresponding to a first controller operation for controlling the visual aid, wherein the first predetermined input gesture comprises pointing a finger from a hand of the user in a direction of the device displaying the visual aid,
wherein the first controller operation corresponding to the first predetermined input gesture comprises generating a visual pointer for the visual aid that moves in a direction corresponding to a movement of the hand of the user, wherein the visual pointer is generated without the finger of the user having to touch the device displaying the visual aid, and wherein the visual pointer is displayed on the device that is displaying the visual aid;
executing the first controller operation if the first gesture from the user matches the first predetermined input gesture;
displaying an output of the executed first controller operation at an interface of a remote device communicatively linked to the visual aid,
wherein displaying the output comprises displaying the visual pointer at the interface of the remote device communicatively linked to the visual aid;
determining if a second gesture from the user matches a second predetermined input gesture corresponding to a second controller operation for adding or removing a remote user of the remote device to or from the presentation respectively, wherein the remote user utilizes the remote device in a location that is remote to the environment, wherein the remote device utilizes a remote connection to connect to the presentation;
adding or removing the remote user of the remote device to or from the presentation respectively if the second gesture from the user matches the second predetermined input gesture;
determining if a third gesture from the user matches a third predetermined input gesture corresponding to a third controller operation for generating a virtual link on the presentation;
generating the virtual link on the presentation if the third gesture from the user matches the third predetermined input gesture;
determining if a fourth gesture from the user matches a fourth predetermined input gesture corresponding to stopping audio for the visual aid; and
stopping the audio for the visual aid when the fourth gesture from the user matches the fourth predetermined input gesture.

2. The system of claim 1, wherein the operations further comprise projecting an ultraviolet light grid pattern into the environment, wherein the ultraviolet light grid pattern is utilized to generate the three-dimensional depth image of the environment when the camera in the system detects an alteration of the ultraviolet light grid pattern.

3. The system of claim 1, wherein a fifth controller operation comprises editing a digital page in the visual aid wherein the first predetermined input gesture comprises pointing a finger from a hand of the user in a direction of the device displaying the visual aid.

4. The system of claim 1, wherein a fifth controller operation comprises closing a different software program wherein the first controller operation corresponding to the first predetermined input gesture comprises generating a visual pointer for the visual aid that moves in a direction corresponding to a movement of the hand of the user, wherein the visual pointer is generated without the finger of the user having to touch the device displaying the visual aid, wherein the visual pointer is displayed on the device that is displaying the visual aid.

5. The system of claim 1, wherein a fifth controller operation comprises opening a different software program wherein displaying the output comprises displaying the visual pointer at the interface of the remote device communicatively linked to the visual aid.

6. The system of claim 1, wherein a fifth the first predetermined input gesture comprises waving the hand of the user in a predetermined direction with respect to the device displaying the visual aid.

7. The system of claim 6, wherein a fifth the first controller operation corresponding to the fifth first predetermined input gesture comprises changing to a new a digital page in the visual aid.

8. The system of claim 7, wherein displaying the output further comprises displaying the new digital page in the visual aid.

9. The system of claim 1, wherein a fifth the first predetermined input gesture comprises pointing a laser pointer laser beam at the device displaying the visual aid.

10. The system of claim 9, wherein a fifth the first controller operation corresponding to the fifth first predetermined input gesture comprises generating a visual representation of the laser pointer laser beam that moves in a direction corresponding to a movement of the laser pointer laser beam.

11. The system of claim 10, wherein displaying the output further comprises displaying the visual representation of the laser pointer laser beam at the interface of the remote device communicatively linked to the visual aid.

12. The system of claim 1, wherein the operations further comprise detecting speech from the user and executing a voice command based on the speech from the user to control the visual aid.

13. A method for providing wireless control of a visual aid based on movement detection, comprising:
presenting a presentation by utilizing the visual aid;
positioning an image capture device on a shoulder of a user;
receiving, via a software program running the visual aid, a selection of an option to activate a light emitter of the image capture device and generate a three-dimensional depth image, wherein the option is selected via a menu in the software program;
activating, after receiving the selection of the option to activate the light emitter and generate the three-dimensional depth image, the light emitter of the image capture device positioned on the shoulder of the user;
generating, after receiving the selection of the option to activate the light emitter and generate the three-dimensional depth image and after activating the light emitter, the three-dimensional depth image of an environment including hands of the user and a device displaying the visual aid, wherein the hands of the user are positioned between the image capture device and the presentation;
determining, based on the three-dimensional depth image, a position of the user relative to the environment, relative to the device displaying the visual aid, and relative to a camera of the image capture device in the system;
detecting a first gesture from the user based in part on the position of the user and the three-dimensional depth image;
determining if the first gesture from the user matches a first predetermined input gesture corresponding to a first controller operation for controlling the visual aid, wherein the first predetermined input gesture comprises pointing a finger from a hand of the user in a direction of the device displaying the visual aid, wherein the first controller operation corresponding to the first predetermined input gesture comprises generating a visual pointer for the visual aid that moves in a direction corresponding to a movement of the hand of the user, wherein the visual pointer is generated without the finger of the user having to touch the device displaying the visual aid, wherein the visual pointer is displayed on the device that is displaying the visual aid;

executing the first controller operation if the first gesture from the user matches the first predetermined input gesture by utilizing instructions stored in memory and executed by a processor;

displaying an output of the executed first controller operation at an interface of a remote device communicatively linked to the visual aid, wherein displaying the output comprises displaying the visual pointer at the interface of the remote device communicatively linked to the visual aid;

determining if a second gesture from the user matches a second predetermined input gesture corresponding to a second controller operation for adding or removing a remote user of the remote device to or from the presentation respectively, wherein the remote user utilizes the remote device in a location that is remote to the environment, wherein the remote device utilizes a remote connection to connect to the presentation;

adding or removing the remote user of the remote device to or from the presentation respectively if the second gesture from the user matches the second predetermined input gesture;

determining if a third gesture from the user matches a third predetermined input gesture corresponding to a third controller operation for generating a virtual link on the presentation;

generating the virtual link on the presentation if the third gesture from the user matches the third predetermined input gesture;

determining if a fourth gesture from the user matches a fourth predetermined input gesture corresponding to stopping audio for the visual aid; and stopping the audio for the visual aid when the fourth gesture from the user matches the fourth predetermined input gesture.

14. The method of claim 13, further comprising projecting a light grid pattern into the environment, wherein the light grid pattern is utilized to generate the three-dimensional depth image of the environment.

15. The method of claim 13, wherein a fifth the first predetermined input gesture comprises pointing a laser pointer laser beam at the device displaying the visual aid.

16. The method of claim 15, wherein a fifth the first controller operation corresponding to the fifth first predetermined input gesture comprises generating a visual representation of the laser pointer laser beam that moves in a direction corresponding to a movement of the laser pointer laser beam.

17. The method of claim 16, wherein displaying the output further comprises displaying the visual representation of the laser pointer laser beam in the direction corresponding to the movement of the laser point laser beam at the interface of the remote device communicatively linked to the visual aid.

18. The method of claim 13, wherein a fifth the first controller operation comprises adjusting a volume associated with the visual aid.

19. The method of claim 13, wherein a fifth the first controller operation comprises adjusting media content associated with the visual aid.

20. A non-transitory computer-readable medium comprising instructions, which when executed by a processor, cause the processor to perform operations comprising:

presenting a presentation by utilizing the visual aid;

positioning an image capture device on a shoulder of a user;

receiving, via a software program running the visual aid, a selection of an option to activate a light emitter of the image capture device and generate a three-dimensional depth image, wherein the option is selected via a menu in the software program;

activating, after receiving the selection of the option to activate the light emitter and generate the three-dimensional depth image, the light emitter of the image capture device positioned on the shoulder of the user;

generating, after receiving the selection of the option to activate the light emitter and generate the three-dimensional depth image and after activating the light emitter, the three-dimensional depth image of an environment including hands of the user and a device displaying the visual aid, wherein the hands of the user are positioned between the image capture device and the presentation;

determining, based on the three-dimensional depth image, a position of the user relative to the environment, relative to the device displaying the visual aid, and relative to a camera of the image capture device in the system;

detecting a first gesture from the user based in part on the position of the user and the three-dimensional depth image;

determining if the first gesture from the user matches a first predetermined input gesture corresponding to a first controller operation for controlling the visual aid, wherein the first predetermined input gesture comprises pointing a finger from a hand of the user in a direction of the device displaying the visual aid, wherein the first controller operation corresponding to the first predetermined input gesture comprises generating a visual pointer for the visual aid that moves in a direction corresponding to a movement of the hand of the user, wherein the visual pointer is generated without the finger of the user having to touch the device displaying the visual aid, wherein the visual pointer is displayed on the device that is displaying the visual aid;

executing the first controller operation if the first gesture from the user matches the first predetermined input gesture;

displaying an output of the executed first controller operation at an interface of a remote device communicatively linked to the visual aid, wherein displaying the output comprises displaying the visual pointer at the interface of the remote device communicatively linked to the visual aid;

determining if a second gesture from the user matches a second predetermined input gesture corresponding to a second controller operation for adding or removing a remote user of the remote device to or from the presentation respectively, wherein the remote user utilizes the remote device in a location that is remote to the environment, wherein the remote device utilizes a remote connection to connect to the presentation;

adding or removing the remote user of the remote device to or from the presentation respectively if the second gesture from the user matches the second predetermined input gesture;

determining if a third gesture from the user matches a third predetermined input gesture corresponding to a third controller operation for generating a virtual link on the presentation;

generating the virtual link on the presentation if the third gesture from the user matches the third predetermined input gesture;

determining if a fourth gesture from the user matches a fourth predetermined input gesture corresponding to stopping audio for the visual aid; and stopping the audio for the visual aid when the fourth gesture from the user matches the fourth predetermined input gesture.

\* \* \* \* \*